(12) United States Patent
Parrish et al.

(10) Patent No.: US 11,870,228 B2
(45) Date of Patent: Jan. 9, 2024

(54) TRAPEZE SUPPORT BRACKET FOR A WIRE BASKET

(71) Applicant: Panduit Corp., Tinley Park, IL (US)

(72) Inventors: Jeremy S. Parrish, Frankfort, IL (US); Bon B. Sledzinski, Westmont, IL (US); David W. West, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/592,564

(22) Filed: Feb. 4, 2022

(65) Prior Publication Data

US 2022/0278512 A1 Sep. 1, 2022

Related U.S. Application Data

(60) Provisional application No. 63/155,023, filed on Mar. 1, 2021.

(51) Int. Cl.
*H02G 3/04* (2006.01)
*F16L 3/26* (2006.01)

(52) U.S. Cl.
CPC .............. *H02G 3/0456* (2013.01); *F16L 3/26* (2013.01)

(58) Field of Classification Search
CPC .... H02G 3/0437; H02G 3/263; H02G 3/0443; H02G 3/0456; F16L 3/26
USPC ................. 248/65, 58–64, 251–271
See application file for complete search history.

(56) References Cited

U.S. PATENT DOCUMENTS

| 3,806,994 | A | | 4/1974 | Lankford | |
|---|---|---|---|---|---|
| 4,607,818 | A | * | 8/1986 | Georgopoulos | E06B 9/323 160/902 |
| 5,180,130 | A | * | 1/1993 | McMichael | E06B 9/323 248/221.11 |
| 5,230,493 | A | * | 7/1993 | Luoto | E06B 9/323 248/254 |
| 6,254,040 | B1 | | 7/2001 | Mc Grath | |
| 6,322,029 | B1 | * | 11/2001 | Sonnenberg | E06B 9/323 248/261 |
| 6,471,171 | B1 | | 10/2002 | Vandervelde | |
| 6,530,545 | B2 | | 3/2003 | Deciry et al. | |
| 6,565,048 | B1 | | 5/2003 | Meyer | |
| 7,073,761 | B2 | | 7/2006 | Diggle et al. | |
| 7,661,915 | B2 | | 2/2010 | Whipple | |
| 8,157,235 | B2 | | 4/2012 | Quertelet et al. | |

(Continued)

FOREIGN PATENT DOCUMENTS

| EP | 1197698 A1 | 4/2002 |
|---|---|---|
| EP | 1376808 A1 | 1/2004 |

(Continued)

*Primary Examiner* — Christopher Garft
(74) *Attorney, Agent, or Firm* — Christopher S. Clancy; James H. Williams; Aimee E. McVady

(57) ABSTRACT

A wire basket system formed of a wire basket and a support bracket that secures the wire basket to the ceiling by a threaded rod. The support bracket includes a main member with a top, a bottom, a first end, a second end, a first side, and a second side. A first arm extends downwardly from the first side of the main member and a second arm extends downwardly from the second side of the main member. The first arm and the second arm include a J-shaped hook. The J-shaped hooks of the first and second arms are aligned thereby enabling the support bracket to receive a wire of the wire basket in the wire basket system.

9 Claims, 10 Drawing Sheets

(56) References Cited

U.S. PATENT DOCUMENTS

| | | | |
|---|---|---|---|
| 8,540,090 B2 | 9/2013 | Caveney et al. | |
| 8,602,365 B2 * | 12/2013 | Neace | F16M 13/02 |
| | | | 248/692 |
| 9,178,343 B2 | 11/2015 | Brouwer et al. | |
| 9,447,914 B2 | 9/2016 | Neace | |
| 9,853,428 B2 | 12/2017 | Brouwer et al. | |
| 2001/0044992 A1 * | 11/2001 | Jahrling | A47B 88/43 |
| | | | 24/563 |
| 2002/0047073 A1 * | 4/2002 | Deciry | H02G 3/32 |
| | | | 248/339 |
| 2009/0242710 A1 * | 10/2009 | Quertelet | H02G 3/32 |
| | | | 248/65 |
| 2015/0078809 A1 * | 3/2015 | Winn | H02G 3/0443 |
| | | | 403/188 |

FOREIGN PATENT DOCUMENTS

| | | | | |
|---|---|---|---|---|
| EP | 2028739 A1 | 2/2009 | | |
| EP | 2838170 B1 * | 3/2016 | | H02G 3/0443 |
| EP | 3012929 A1 | 4/2016 | | |
| FR | 2929459 A1 | 10/2009 | | |

* cited by examiner

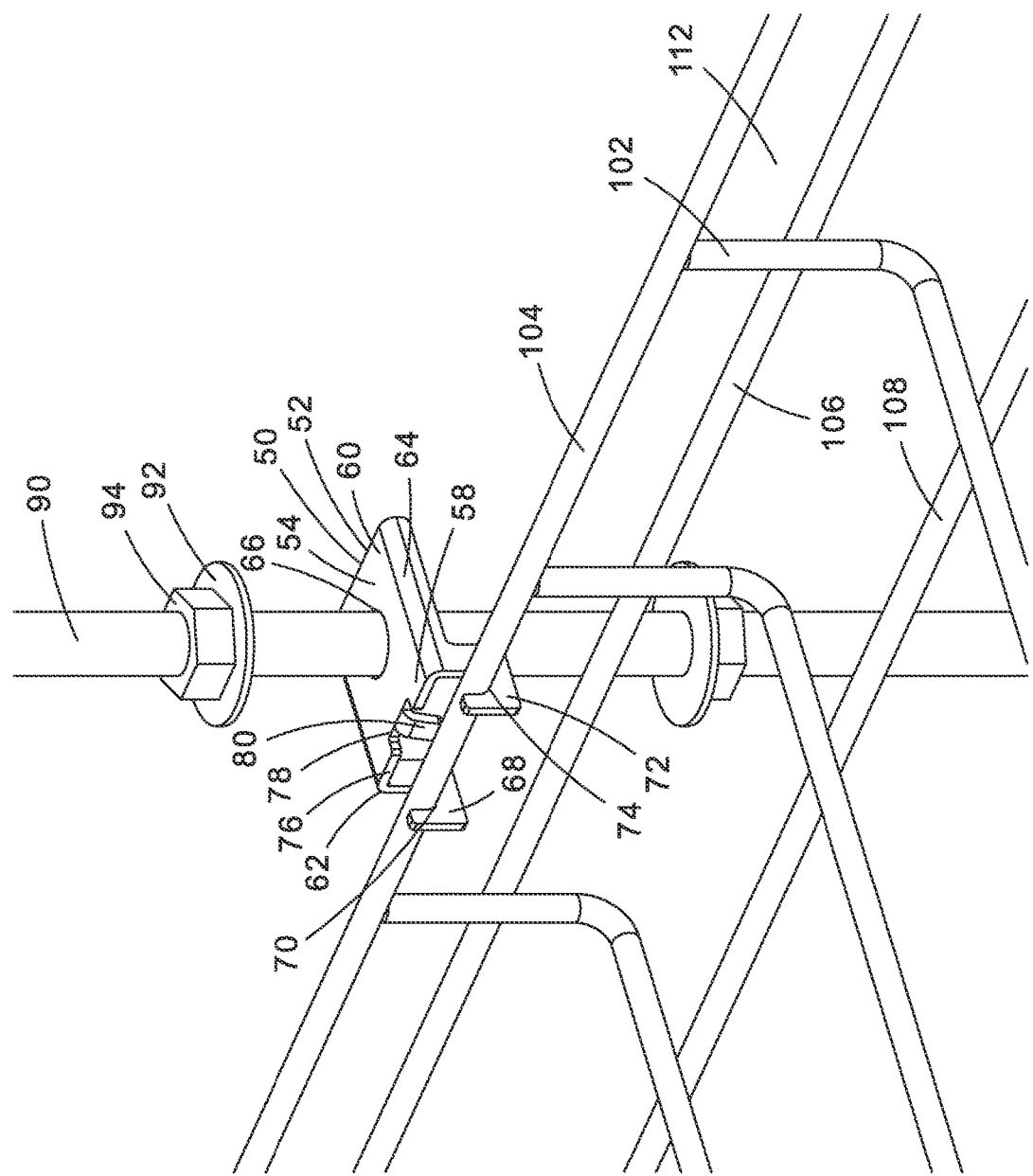

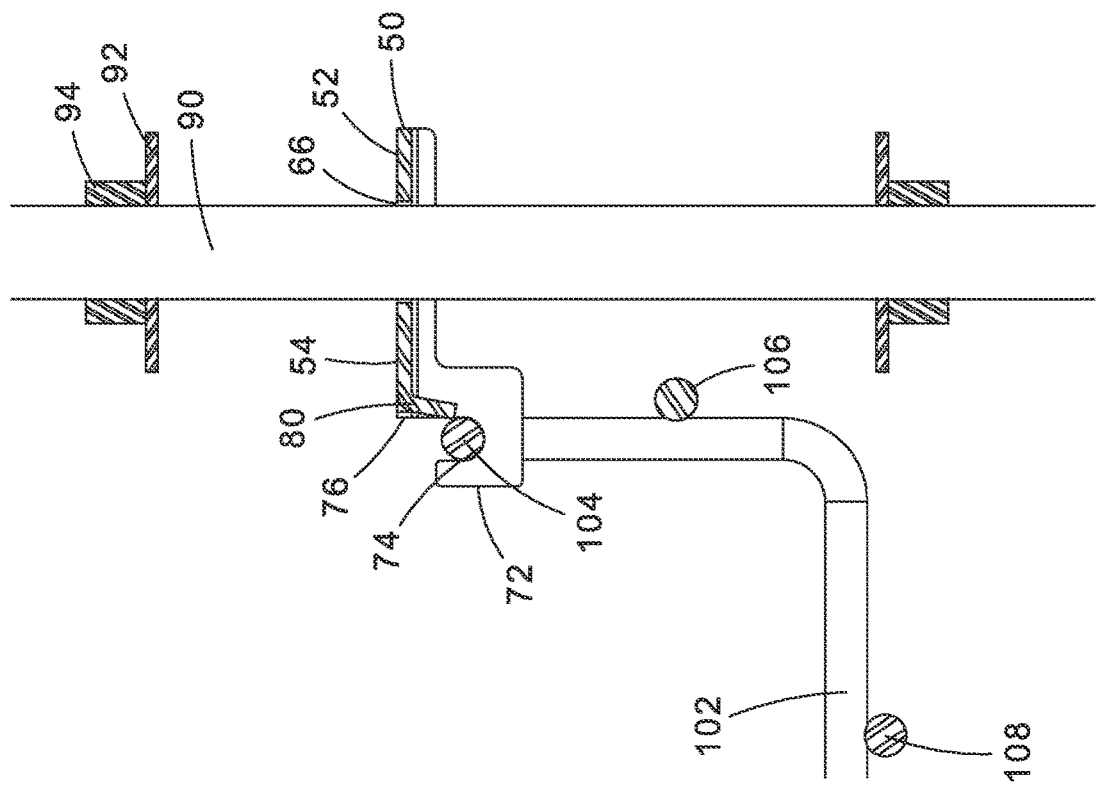
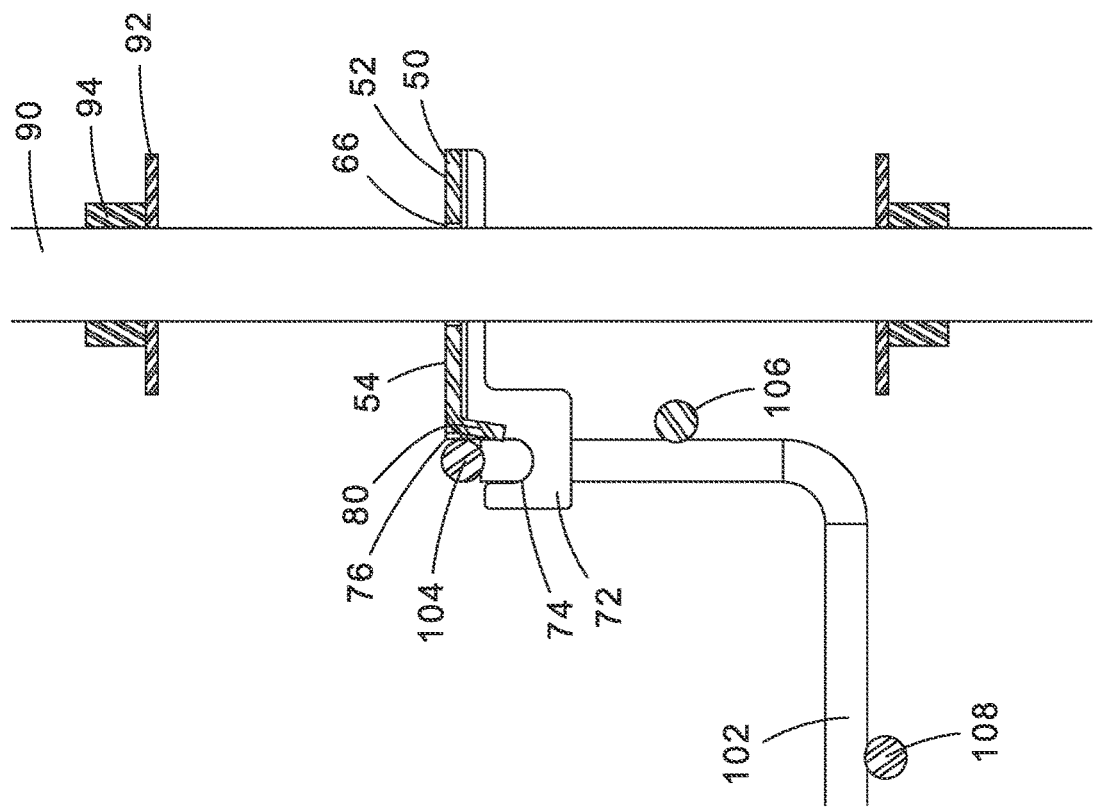

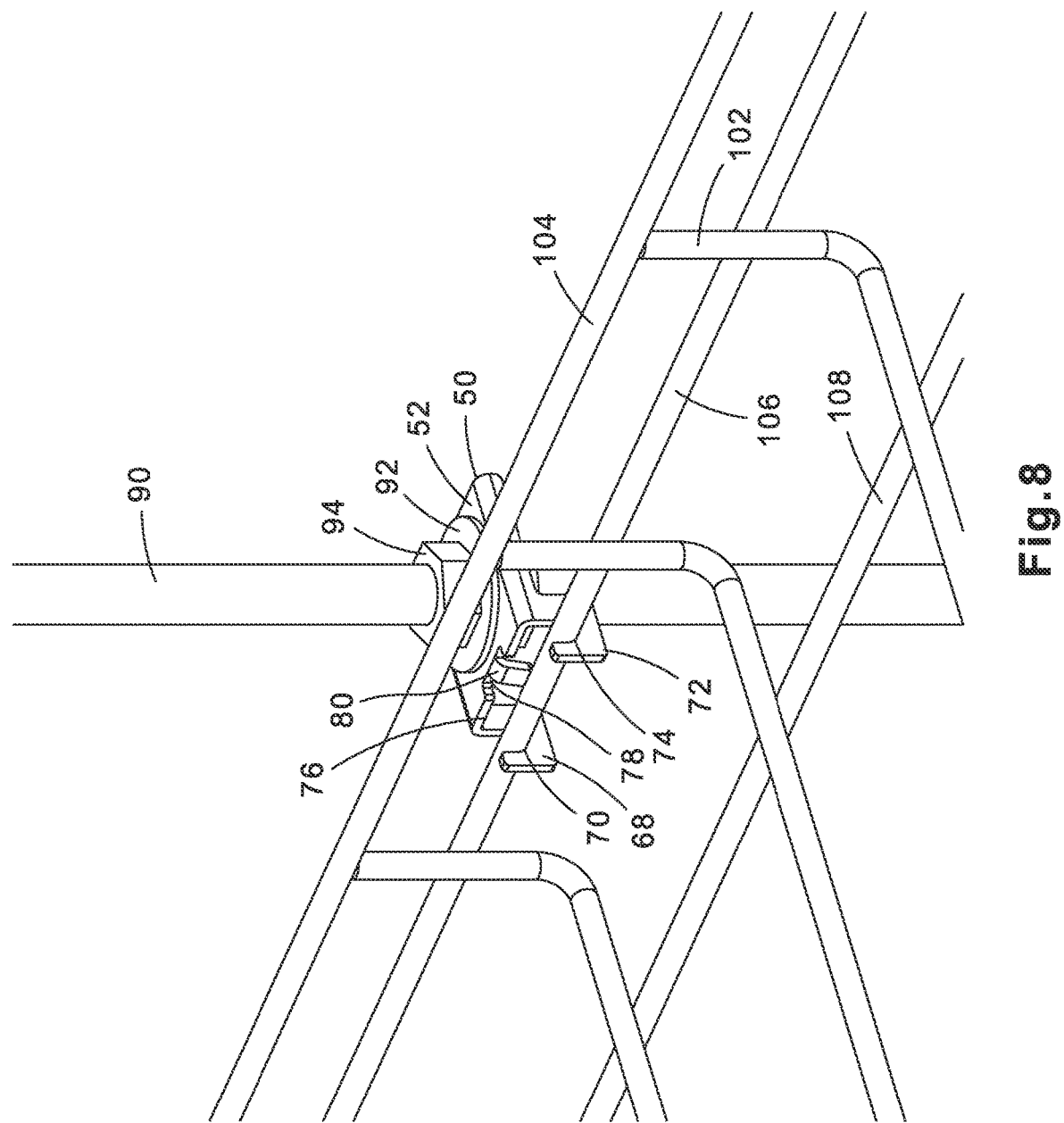

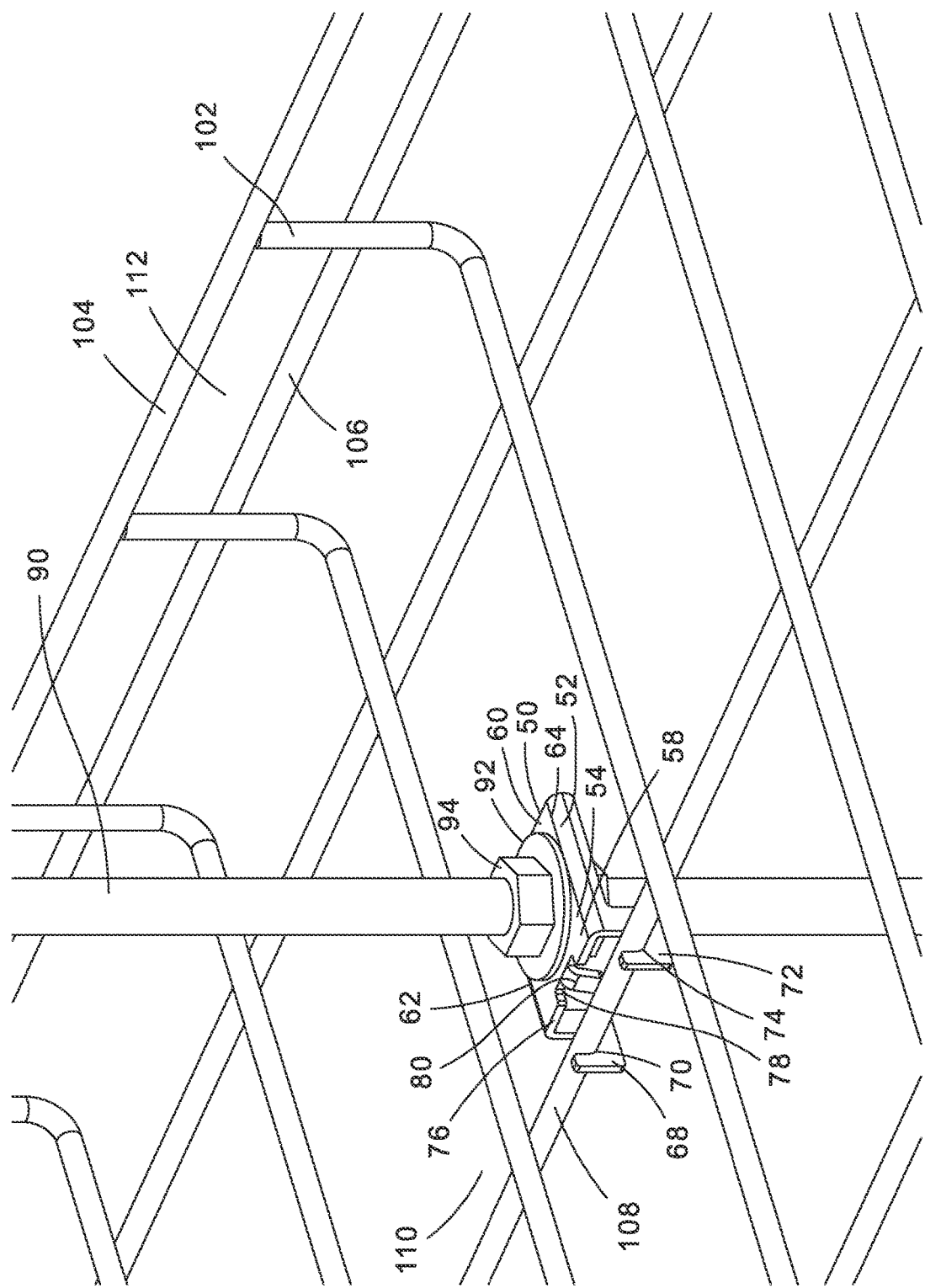

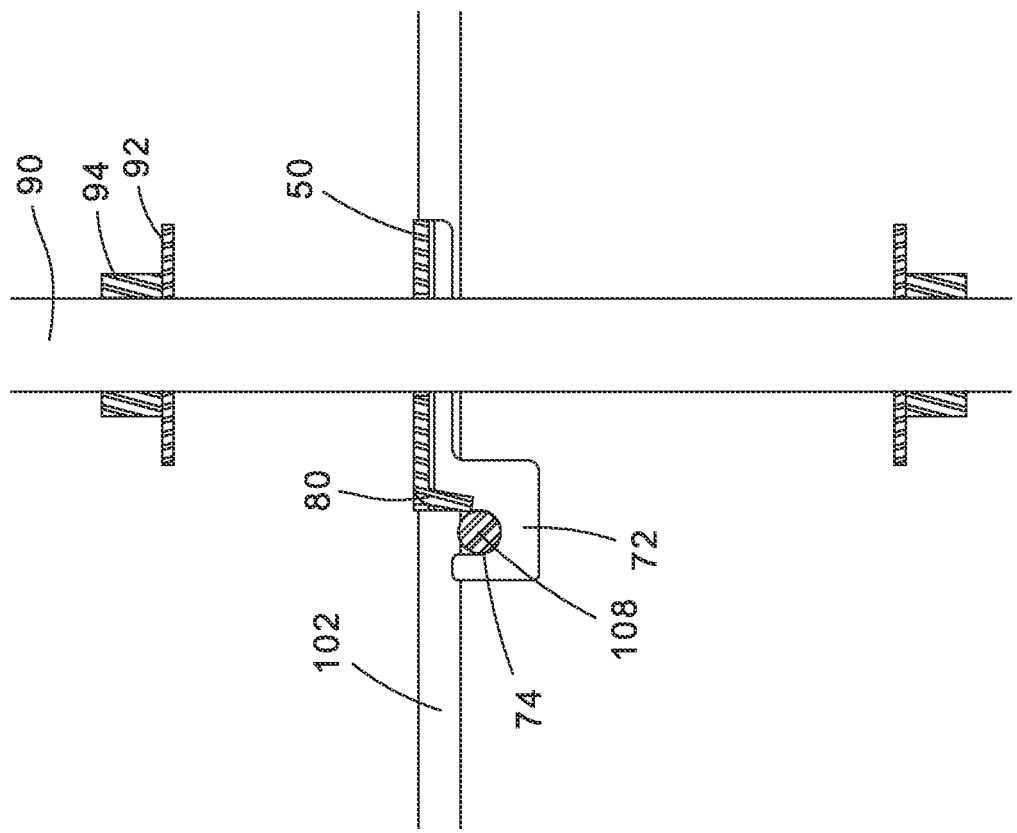
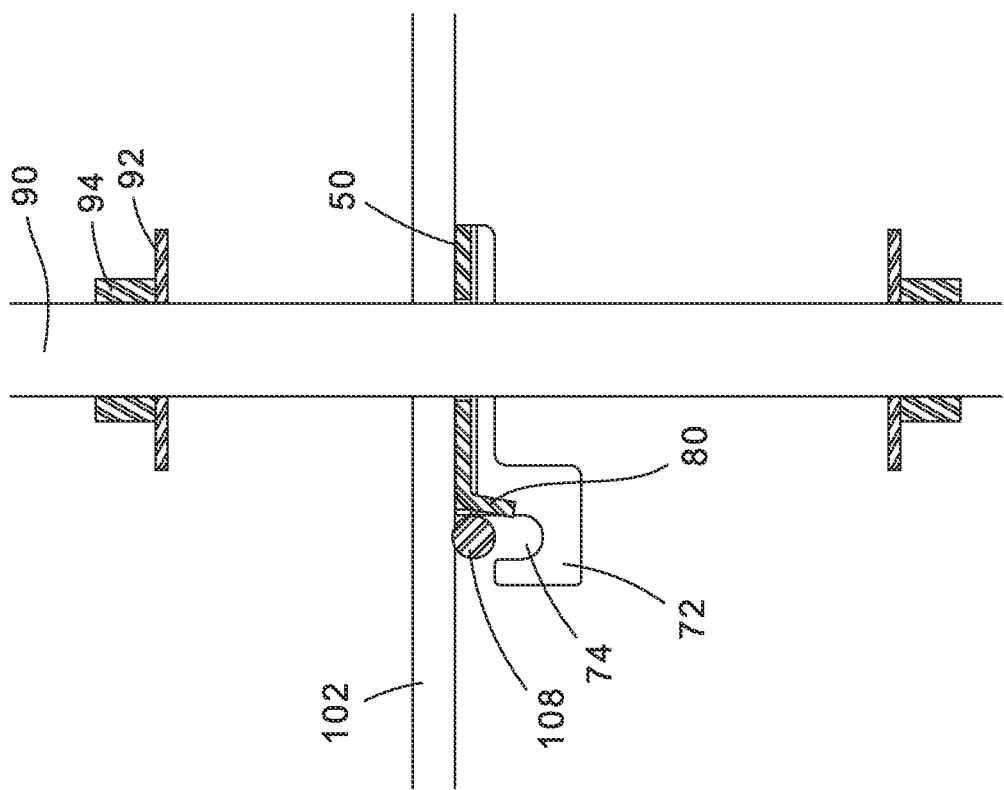

TRAPEZE SUPPORT BRACKET FOR A WIRE BASKET

CROSS REFERENCE TO RELATED APPLICATION(S)

This application claims priority to U.S. Provisional Application No. 63/155,023, filed Mar. 1, 2021, the subject matter of which is hereby incorporated by reference in its entirety.

FIELD OF THE INVENTION

The present invention relates to a bracket for a wire basket, and more particularly to a trapeze support bracket for wire baskets in a wire basket system.

BACKGROUND OF THE INVENTION

Wire basket systems generally provide support for cables such as electrical wiring, conduit and data transmission lines. Each wire basket is formed from interconnected metal wires. The wire baskets are connected to other wire baskets at intersections to route the cables and form a wire basket system. The intersections may be three-way intersections, or T-intersection, or four-way intersections. The wire basket system may be supported on cabinets in data center. The wire basket system may also be supported by wall mount brackets or trapeze brackets secured to a ceiling.

It is desirable to provide an improved trapeze support bracket capable of being installed at multiple locations on the wire basket. It is also desirable to provide an improved trapeze support bracket that enables wire baskets to be hung where standard brackets will not fit due to building obstructions.

SUMMARY OF THE INVENTION

A support bracket designed to receive a threaded rod for securing a wire basket to a ceiling in a wire basket system. The support bracket has a main member with a top, a bottom, a first end, a second end, a first side, and a second side. A first arm extends downwardly from the first side of the main member. A second arm extends downwardly from the second side of the main member. The first arm and the second arm each including a J-shaped hook. The J-shaped hooks of the first and second arms are aligned to enable the support bracket to receive a wire of the wire basket in the wire basket system.

BRIEF DESCRIPTION OF THE DRAWINGS

FIG. 5 is a perspective view of the trapeze support bracket of FIG. 4 partially installed on the upper longitudinal wire of the side wall of the wire basket.

FIG. 6A is a cross sectional view of the trapeze support bracket and wire basket of FIG. 4.

FIG. 6B is a cross sectional view of the trapeze support bracket and wire basket of FIG. 5.

FIG. 8 is a perspective view of the trapeze support bracket of FIG. 1 installed on a lower longitudinal wire of the side wall of the wire basket.

FIG. 9 is a perspective view of the trapeze support bracket of FIG. 1 installed on a bottom longitudinal wire of the wire basket.

FIG. 10A is a cross sectional view of the trapeze support bracket of FIG. 1 positioned to be installed on a bottom longitudinal wire of the wire basket.

FIG. 10B is a cross sectional view of the trapeze support bracket of FIG. 10A partially installed on the bottom longitudinal wire of the wire basket.

DETAILED DESCRIPTION

Figure 1:
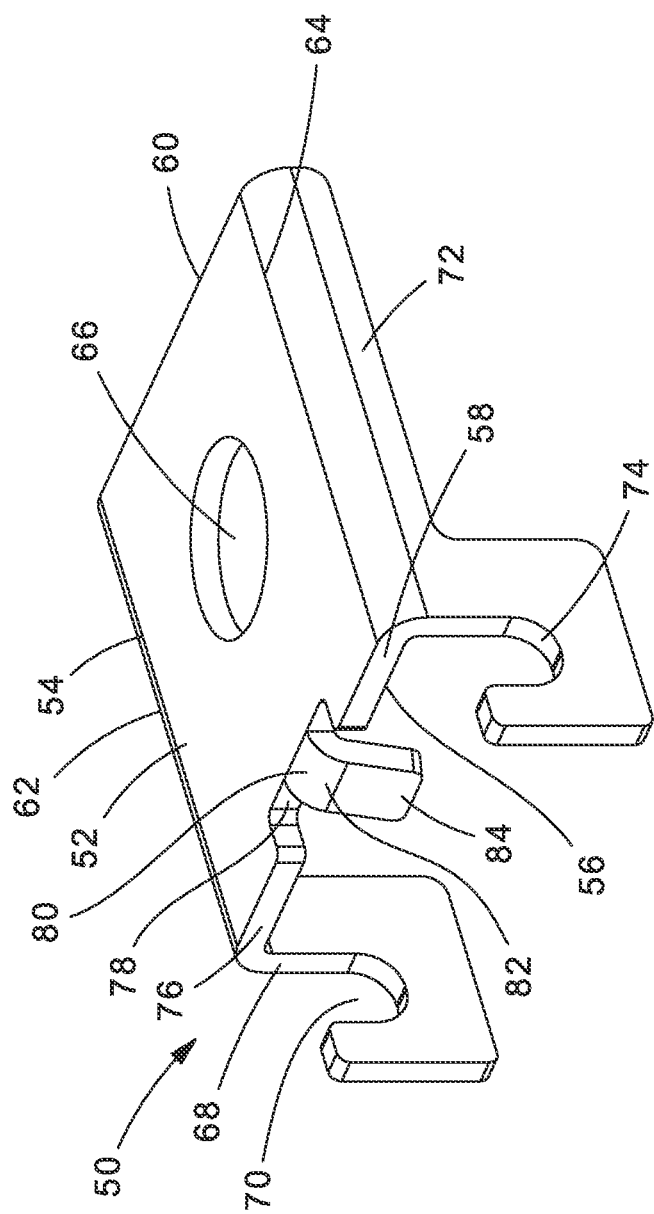
FIG. 1 is a perspective view of the trapeze support bracket of the present invention.

FIG. 1 illustrates a perspective view of the trapeze support bracket 50 of the present invention. The trapeze support bracket 50 has a main member 52 with a top 54, a bottom 56, a first end 58, a second end 60, a first side 62 and a second side 64. The center of the main member 52 includes an opening 66 that extends from the top 54 of the main member 52 to the bottom 56 of the main member 52. The opening 66 receives a threaded rod 90 (shown in FIG. 2) to enable the trapeze support bracket 50 to be secured to a ceiling. An alternate installation to the rod secured to the ceiling is that the rod may be supported from below. For example, the rod may be anchored to a cabinet in the data center (not illustrated). The opening 66 in the main member 52 is designed to receive ¼", ⅜", or ½" threaded rods.

The trapeze support bracket 50 includes a first arm 68 that extends downward from the first side 62 of the main member 52 and a second arm 72 that extends downward from the second side 64 of the main member 52. The first arm 68 and the second arm 72 extend beyond the first end 58 of the main member. The first arm 68 and the second arm 72 each include a J-shaped hook 70, 74, respectively. The J-shaped hooks 70, 74 of the first arm 68 and the second arm 72, respectively, are aligned with each other to enable the trapeze support bracket 50 to receive a longitudinal wire 104, 106, or 108 of the wire basket 100.

The first end 58 of the main member 52 includes an outer edge 76 and an indented edge 78. The indented edge 78 is centered between the first side 62 and the second side 64 of the trapeze support bracket 50. A latch 80 extends from the indented edge 78 at an angle towards the extended first and second arms 68, 72, respectively. The latch 80 includes a curved upper member 82 that leads to a generally rectangular bottom member 84. As discussed below, the latch 80 extends between the first and second arms 68, 72, respectively, such that the latch 80 engages the longitudinal wire 104, 106, or 108 of the wire basket 100 when the longitudinal wire 104, 106, or 108 is positioned in the aligned J-hooks 70, 74 of the first and second arms 68, 72, respectively.

FIGS. 2-7 illustrate a wire basket 100 and the trapeze support bracket 50 installed on the wire basket 100. The wire basket 100 is formed from a plurality of parallel and perpendicular metal wires that form a mesh pattern. The wire basket 100 includes a plurality of transverse or cross wires 102 that extend from one side, across the bottom of the wire basket, to the opposite side. The wire basket 100 also includes a plurality of parallel longitudinal wires 104, 106, 108 that extend the length of the wire basket 100. Bottom longitudinal wires 108 are positioned along the bottom of the transverse wires 102 to form the bottom 110 of the wire basket 100. An upper longitudinal wire 104 and a lower longitudinal wire 106 are positioned along the tops and each side of the transverse wires 102 to form the side walls 112 of the wire basket 100. As a result, the mesh pattern forms a wire basket 100 that supports cables and routes cables along the length of the wire basket 100.

The wire baskets are often supported by trapeze brackets that extend under the wire basket, wall mount brackets or brackets secured to threaded rods affixed to ceilings. The trapeze support bracket of the present invention engages threaded rods in various positions along the wire basket to support the wire basket.

Figure 2:
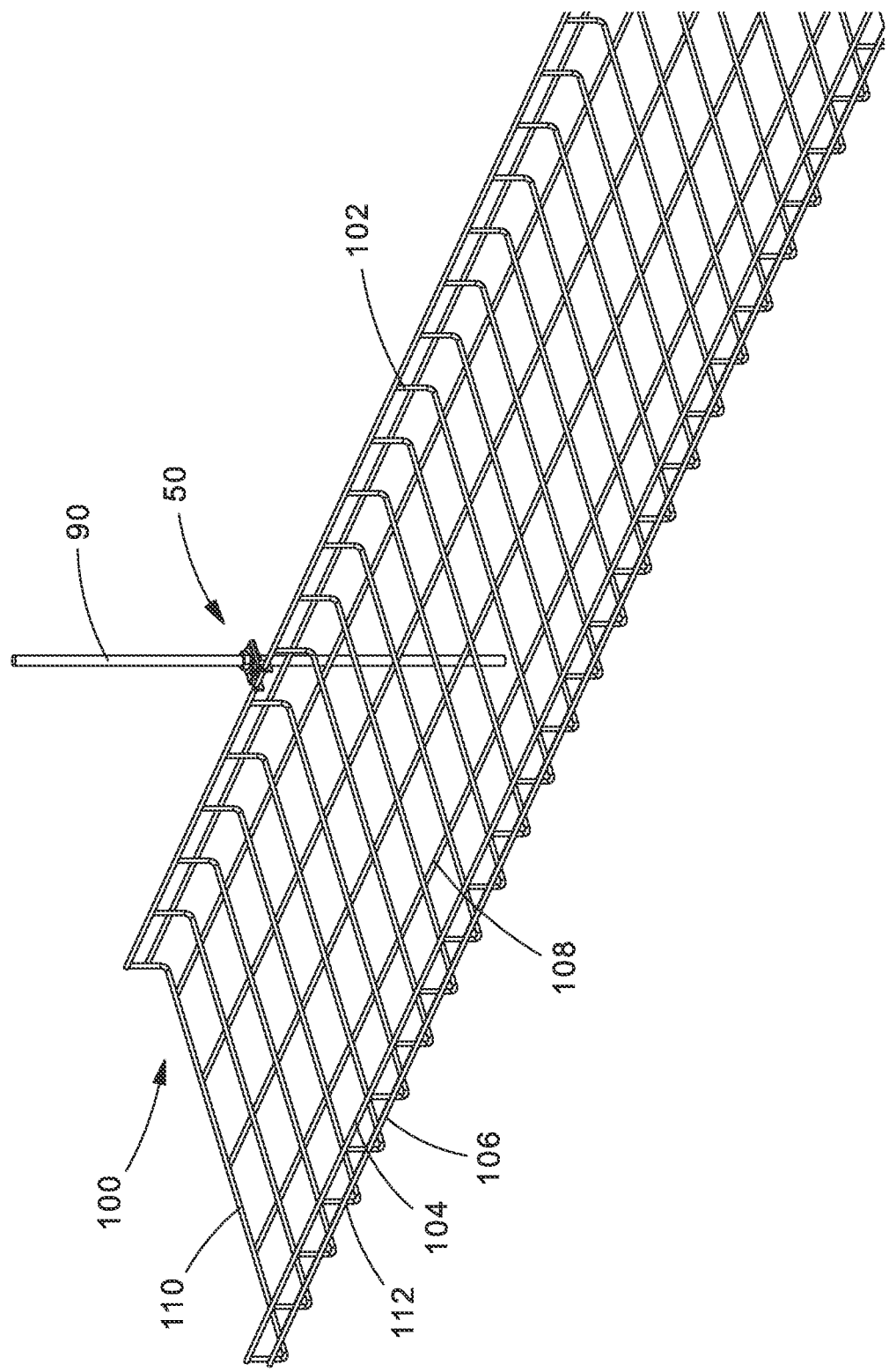
FIG. 2 is a perspective view of the trapeze support bracket of FIG. 1 installed on an upper longitudinal wire of a side wall of a wire basket.
Figure 3:
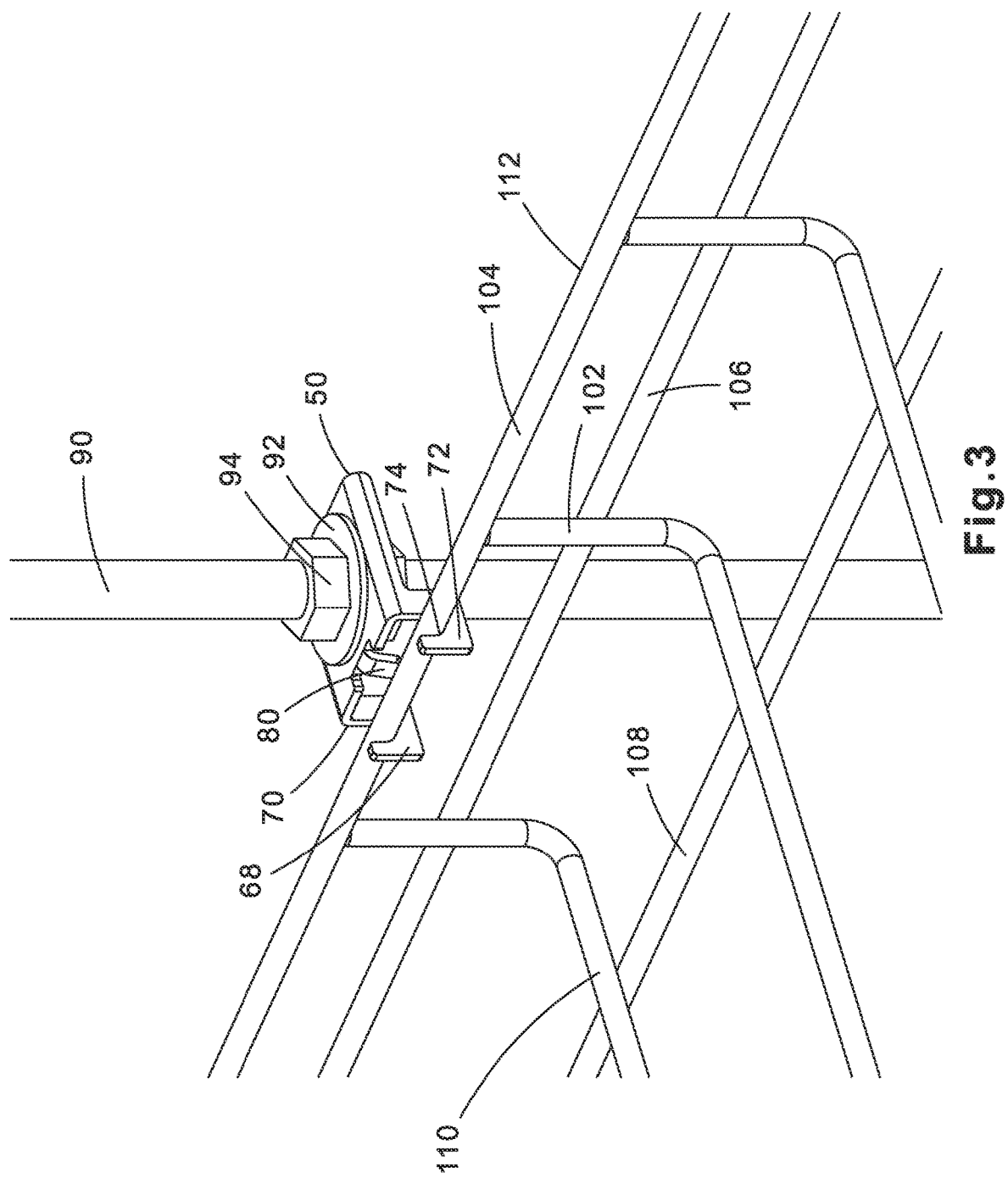
FIG. 3 is a perspective view of the trapeze support bracket installed on the upper longitudinal wire of the side wall of the wire basket of FIG. 2.
Figure 4:
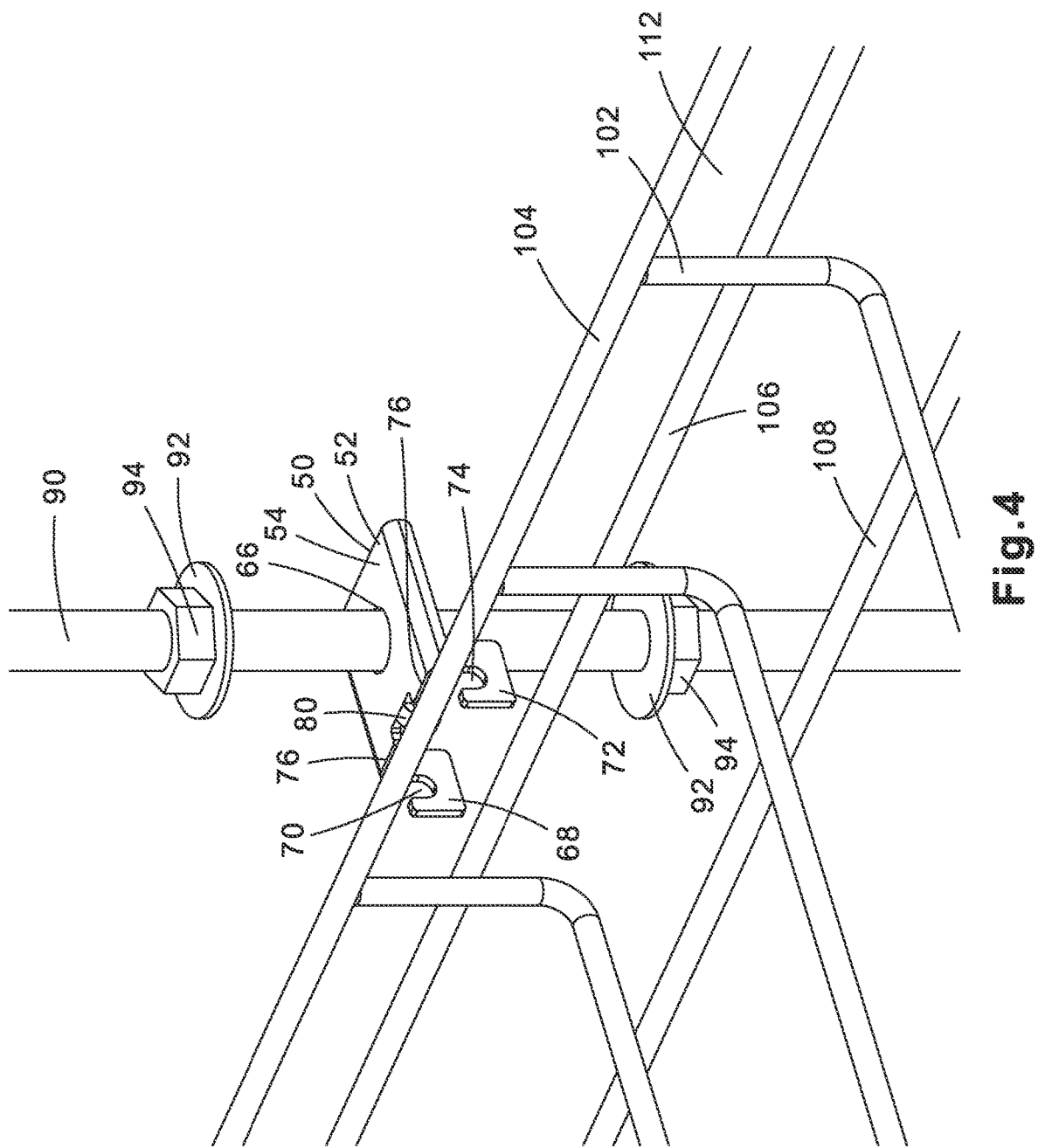
FIG. 4 is a perspective view of the trapeze support bracket of FIG. 1 positioned to be installed on the upper longitudinal wire of the side wall of the wire basket.
Figure 7:
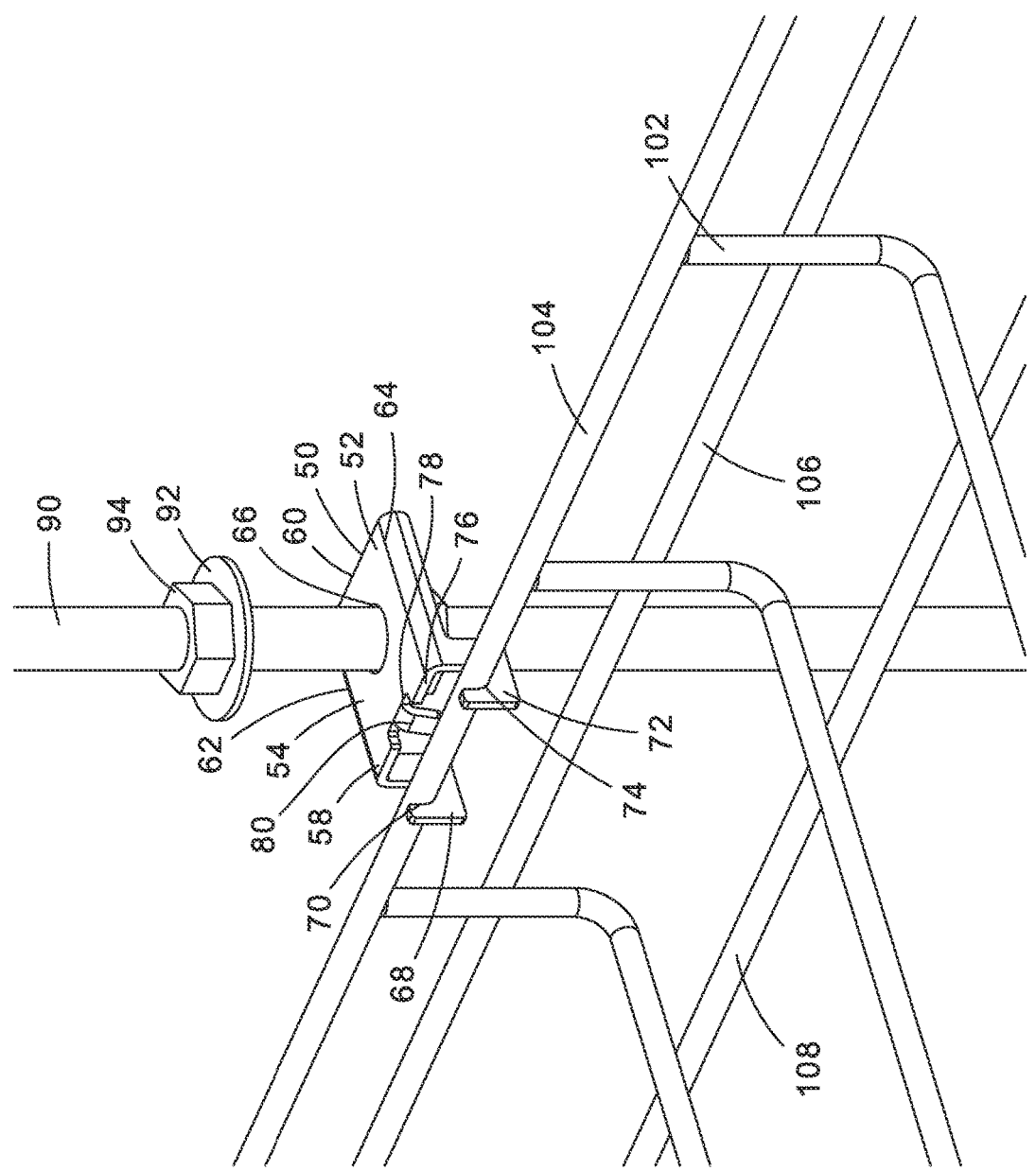
FIG. 7 is a perspective view of the trapeze support bracket of FIG. 5 partially installed on the upper longitudinal wire of the side wall of the wire basket.

As illustrated in FIGS. 2 and 3, the trapeze support bracket 50 engages the upper longitudinal wire 104 of one of the side walls 112 of the wire basket 100. FIGS. 4-7 illustrate the installation of the trapeze support bracket 50. A threaded rod 90 with a washer 92 and nut 94 is installed in the center opening 66 of the main member 52 of the trapeze bracket 50. A second washer 92 and nut 94 are installed on the threaded rod 90 and positioned to engage the bottom 56 of the main member 52 of the trapeze support bracket 50 once fully installed. As illustrated in FIGS. 4 and 6A, the trapeze support bracket 50 is positioned below the upper longitudinal wire 104 with the upper longitudinal wire 104 positioned against the outer edge 76 of the main member 52 above the J-hooks 70, 74 in the first and second arms 68, 72, respectively. As illustrated in FIGS. 5 and 6B, the trapeze support bracket 50 is raised so it is snapped onto the upper longitudinal wire 104. The upper longitudinal wire 104 is positioned within the J-hooks 70, 74 in the first and second arms 68, 72 and the latch 80 engages the upper longitudinal wire 104. Once the trapeze support bracket 50 has been snapped into place, the bottom nut 94 and washer 92 are raised to engage the bottom 56 of the main member 52 of the trapeze support bracket 50 and the top nut 94 and washer 92 are lowered to engage the top 54 of the main member 52 of the trapeze support bracket 50 to secure the trapeze support bracket 50 to the threaded rod 90.

FIG. 8 illustrates the trapeze support bracket 50 installed on the lower longitudinal wire 106 of the side wall 112 of the wire basket 100. As discussed above, the trapeze support bracket 50 is designed to capture one of the longitudinal wires 104, 106, or 108 of the wire basket 100. The trapeze support bracket 50 is snapped onto the lower longitudinal wire 106 of the wire basket side wall 112 in the same fashion as described above with respect to the upper longitudinal wire 104.

FIGS. 9, 10A, and 10B illustrate the trapeze support bracket 50 installed on one of the bottom longitudinal wires 108. The trapeze support bracket 50 is snapped onto the bottom longitudinal wire 108 in the same fashion as described above with respect to the upper longitudinal wire 104 and the lower longitudinal wire 106.

The ability for the trapeze support bracket 50 to snap on to the bottom longitudinal wires 108 provides extra support for the wire basket 100. This is important when the wire basket sections intersect, and sidewalls of the wire basket are cut to accommodate the intersections. When sidewalls of the wire basket are removed, the wire baskets require extra support to safely maintain the cables routed therein. When the trapeze support bracket 50 of the present invention is installed on a bottom longitudinal wire 108 in the middle of the wire basket intersection, the trapeze support bracket 50 greatly improves the strength of the wire basket 100 and reduces deflection of the wire basket 100. This provides support for a greater cable load routed in the wire basket system.

FIG. 10A illustrate a cross sectional view of the trapeze support bracket 50 before it is installed on the bottom longitudinal wire 108. FIG. 10B illustrates a cross sectional view of the trapezes support bracket 50 partially installed on one of the bottom longitudinal wires 108. The bottom longitudinal wire 108 snaps into the J-hooks 70, 74 of the first and second arms 68, 70, respectively, and the latch 80 engages the bottom longitudinal wire 108. The trapeze support bracket 50 does not protrude into the wire basket 100 which allows for safely routing the cables within the wire basket 100.

Furthermore, while the particular preferred embodiments of the present invention have been shown and described, it will be obvious to those skilled in the art that changes, and modifications may be made without departing from the teaching of the invention. The matter set forth in the foregoing description and accompanying drawings is offered by way of illustration only and not as limitation.

What is claimed is:

1. A wire basket system for routing cabling, the wire basket system comprising:
   at least one wire basket having a plurality of transverse wires extending from a first side of the at least one wire basket, across a bottom of the at least one wire basket to a second side of the at least one wire basket, and a plurality of longitudinal wires extending a length of the at least one wire basket, wherein the plurality of longitudinal wires includes bottom longitudinal wires positioned along a bottom of the transverse wires to form the bottom of the at least one wire basket; and
   support brackets installed on the at least one wire basket, each support bracket having a main member with a top, a bottom, a first end, a second end, a first side, and a second side;
   a first arm extending downwardly from the first side of the main member, the first arm including a J hook; and
   a second arm extending downwardly from the second side of the main member, the second arm including a J hook,
   wherein the first end of the main member has an outer edge, wherein a latch extends at an angle away from the outer edge of the first end of the main member and towards the first arm and the second arm, wherein the latch extends between the first arm and the second arm; and
   wherein one of the bottom longitudinal wires is positioned within the J-hooks of the first and second arms of one of the support brackets and the latch of the one of the support brackets engages the one of the bottom longitudinal wires, wherein the support bracket remains below the at least one wire basket allowing cables to be routed within the at least one wire basket.

2. The wire basket system of claim 1, wherein the plurality of longitudinal wires includes upper longitudinal wires positioned along tops of the transverse wires and lower longitudinal wires positioned along sides of the transverse wires, the upper longitudinal wires, the lower longitudinal wires, and the transverse wires form side walls of the at least one wire basket.

3. The wire basket system of claim 2, wherein one of the upper longitudinal wires is positioned within the J-hooks of the first and second arms of another one of the support brackets and the latch engages the one of the upper longitudinal wires.

4. The wire basket system of claim 2, wherein one of the lower longitudinal wires is positioned within the J-hooks of the first and second arms of another one of the support brackets and the latch engages the one of the lower longitudinal wires.

5. The wire basket system of claim 1, wherein the support brackets engage a threaded rod to support the wire basket, the threaded rod is installed in a center opening in the main member of each support bracket.

6. The wire basket system of claim 1, wherein the main member of the support brackets include a center opening that extends from the top of the main member to the bottom of the main member, whereby the center opening receives a threaded rod secured to a ceiling to enable the support bracket to secure the wire basket to the ceiling.

7. The wire basket system of claim 1, wherein the first end of the main member of the support brackets have an indented edge, the indented edge is centered between the first side of the main member and the second side of the main member.

8. The wire basket system of claim 7, wherein the latch extends from the indented edge.

9. The wire basket system of claim 8, wherein the latch includes a curved upper member that leads to a bottom member, whereby the bottom member of the latch engages one of the plurality of longitudinal wires of the wire basket system.

* * * * *